United States Patent
Brown et al.

(10) Patent No.: US 8,990,929 B2
(45) Date of Patent: Mar. 24, 2015

(54) AUDITING APPLICATION ACTIVITIES

(75) Inventors: Michael K. Brown, Kitchener (CA);
Michael G. Kirkup, Waterloo (CA);
Herbert A. Little, Waterloo (CA)

(73) Assignee: BlackBerry Limited, Waterloo (CA)

( * ) Notice: Subject to any disclaimer, the term of this patent is extended or adjusted under 35 U.S.C. 154(b) by 1101 days.

(21) Appl. No.: 11/465,820

(22) Filed: Aug. 21, 2006

(65) Prior Publication Data

US 2008/0046886 A1 Feb. 21, 2008

(51) Int. Cl.
*H04L 9/00* (2006.01)
*G06F 11/00* (2006.01)
*G06F 21/57* (2013.01)

(52) U.S. Cl.
CPC .................. *G06F 21/577* (2013.01)
USPC ........ 726/22; 726/4; 726/1; 709/220; 718/100

(58) Field of Classification Search
USPC ......................................... 709/223
See application file for complete search history.

(56) References Cited

U.S. PATENT DOCUMENTS

| | | | | |
|---|---|---|---|---|
| 6,088,801 | A * | 7/2000 | Grecsek | 726/1 |
| 6,851,112 | B1 * | 2/2005 | Chapman | 718/1 |
| 7,496,575 | B2 * | 2/2009 | Buccella et al. | 707/9 |
| 2001/0016857 | A1 * | 8/2001 | Sorihashi | 707/511 |
| 2003/0056117 | A1 * | 3/2003 | Elgressy et al. | 713/201 |
| 2004/0025088 | A1 * | 2/2004 | Avvari et al. | 714/38 |
| 2004/0210645 | A1 * | 10/2004 | Kouznetsov et al. | 709/220 |
| 2005/0080813 | A1 * | 4/2005 | Shi et al. | 707/103 R |
| 2005/0120242 | A1 * | 6/2005 | Mayer et al. | 713/201 |
| 2006/0015940 | A1 * | 1/2006 | Zamir et al. | 726/22 |
| 2006/0141985 | A1 * | 6/2006 | Patel et al. | 455/410 |
| 2007/0038974 | A1 * | 2/2007 | Albahari et al. | 717/101 |
| 2007/0266373 | A1 * | 11/2007 | Liu | 717/126 |

FOREIGN PATENT DOCUMENTS

| | | | |
|---|---|---|---|
| GB | 2353918 A | * | 3/2001 |
| WO | WO 2005076105 A1 | * | 8/2005 |

OTHER PUBLICATIONS

Extended European Search Report issued on Feb. 8, 2007 in connection with corresponding application EP06119261.3.
Weber M. et al, A Toolkit for Detecting and Analyzing Malicious Software,18th Annual Computer Security Applications Conference, 2002 Proceedings, Dec. 9-13, 2002, IEEE, Piscataway, NJ, USA.
Exam Report dated Oct. 18, 2013 for the corresponding European Patent Application No. 06119261.3.

* cited by examiner

*Primary Examiner* — Hamza Algibhah
*Assistant Examiner* — Natisha Cox
(74) *Attorney, Agent, or Firm* — Ridout & Maybee LLP

(57) ABSTRACT

A compiled application may be audited by analyzing the compiled application to identify methods that may be called during execution of the compiled application. The identified methods may be correlated with controllable activities, i.e., those activities facilitated by public APIs. An audit report may be used to report to a user or administrator indications that the compiled application may attempt certain activities.

42 Claims, 7 Drawing Sheets

```
Permissions: Exemplary Application
 - Connections              Accessed?
     USB                       Yes      Allow
     Bluetooth                 No       Allow
     Phone                     No       Prompt
     Company Network           No       Prompt
     Carrier Internet          Yes      Prompt
 - Interactions
     Interprocess Communication Yes     Allow      300
     Keystroke Injection       No       Deny
     Browser Filters           No       Deny
     Theme Data                No       Allow
 - User Data
     Email                     No       Allow
     PIM                       No       Allow
     Key Store                 No       Allow
```

Permissions: Exemplary Application

| | Accessed? | |
|---|---|---|
| - Connections | | |
| USB | Yes | Allow |
| Bluetooth | No | Allow |
| Phone | No | Prompt |
| Company Network | No | Prompt |
| Carrier Internet | Yes | Prompt |
| - Interactions | | |
| Interprocess Communication | Yes | Allow |
| Keystroke Injection | No | Deny |
| Browser Filters | No | Deny |
| Theme Data | No | Allow |
| - User Data | | |
| Email | No | Allow |
| PIM | No | Allow |
| Key Store | No | Allow |

FIG. 3

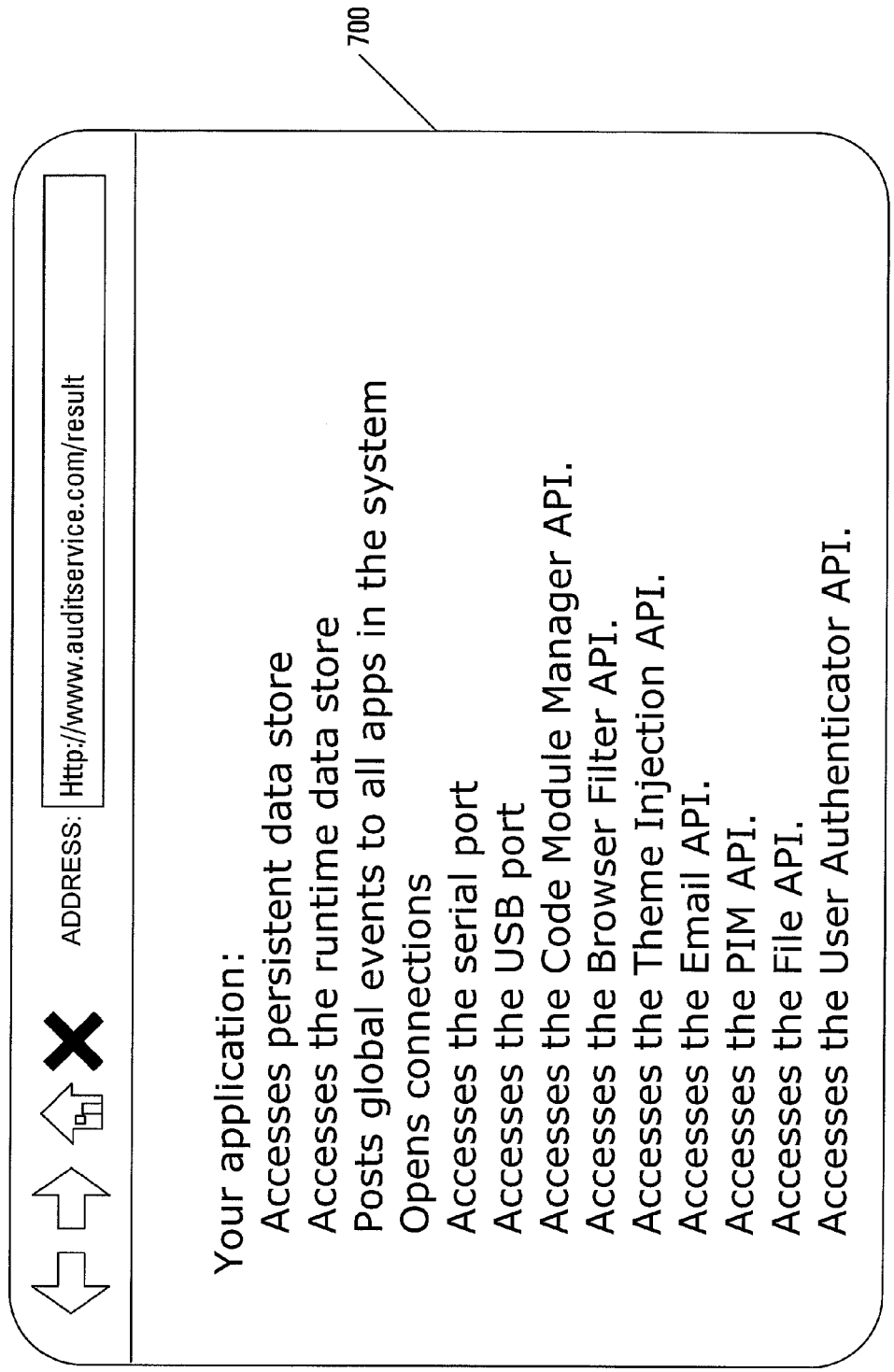

AUDITING APPLICATION ACTIVITIES

FIELD OF THE INVENTION

The present application relates generally to control of application activities on a computing device and, more specifically, to auditing an application to determine potential activities.

BACKGROUND OF THE INVENTION

Mobile communication devices, such as cellular phones and personal digital assistants with wireless data communication capabilities, continue to proliferate. Application software from myriad sources allows the usefulness of these devices to be expanded beyond the usefulness represented by the application suite provided with the devices when provided by the manufacturer.

Many of the applications available may be compiled specifically for a particular mobile device platform. The mobile device platform may be defined by operating system and/or processor and may be proprietary. Alternatively, applications may be compiled specifically for a virtual machine. To allow for a wide range of applications to execute on a device having a given platform, manufacturers typically develop a virtual machine for their particular platform. The virtual machine is developed for a predetermined universal language, such as Java™ or one of the variations of Java™.

For security purposes, a user may want to limit the activities an application may perform and, thereby, limit the resources to which the application has access while executed on a mobile device.

BRIEF DESCRIPTION OF THE DRAWINGS

Reference will now be made to the drawings, which show by way of example, embodiments of the invention, and in which:

FIG. 3 illustrates the user interface window of FIG. 1 augmented with results determined from execution of the method of FIG. 2, according to one embodiment;

FIG. 7 illustrates a window provided by a world wide web browsing application, the window displaying a result of the execution of the application activity auditing tool, an exemplary interface to which is illustrated in FIG. 6.

In the drawings, like reference numerals denote like elements or features.

DETAILED DESCRIPTION OF THE EMBODIMENTS

A compiled application may be audited by analyzing the compiled application to identify methods that may be called during execution of the compiled application. The identified methods may be correlated with controllable activities, i.e., those activities facilitated by public APIs. An audit report may be used to report to a user or administrator indications that the compiled application may attempt certain activities.

In one aspect of the present application, there is provided a method of auditing a compiled application. The method includes analyzing the compiled application to identify a method that may be called during execution of the compiled application, selecting a stored reference, where the stored reference relates to a predetermined method and the predetermined method is associated with an activity, determining whether the predetermined method matches the method that may be called during execution of the compiled application and, where the predetermined method matches the method that may be called during execution of the compiled application, indicating that the compiled application may attempt the activity. In other aspects of the application, a computing apparatus is provided, adapted to audit a compiled application according to this method and a computer readable medium is provided to allow a processor to carry out this method.

Other aspects and features of the application will become apparent to those of ordinary skill in the art upon review of the following description of specific embodiments in conjunction with the accompanying figures.

As discussed above, it is known to set access permissions for applications.

Figure 1:
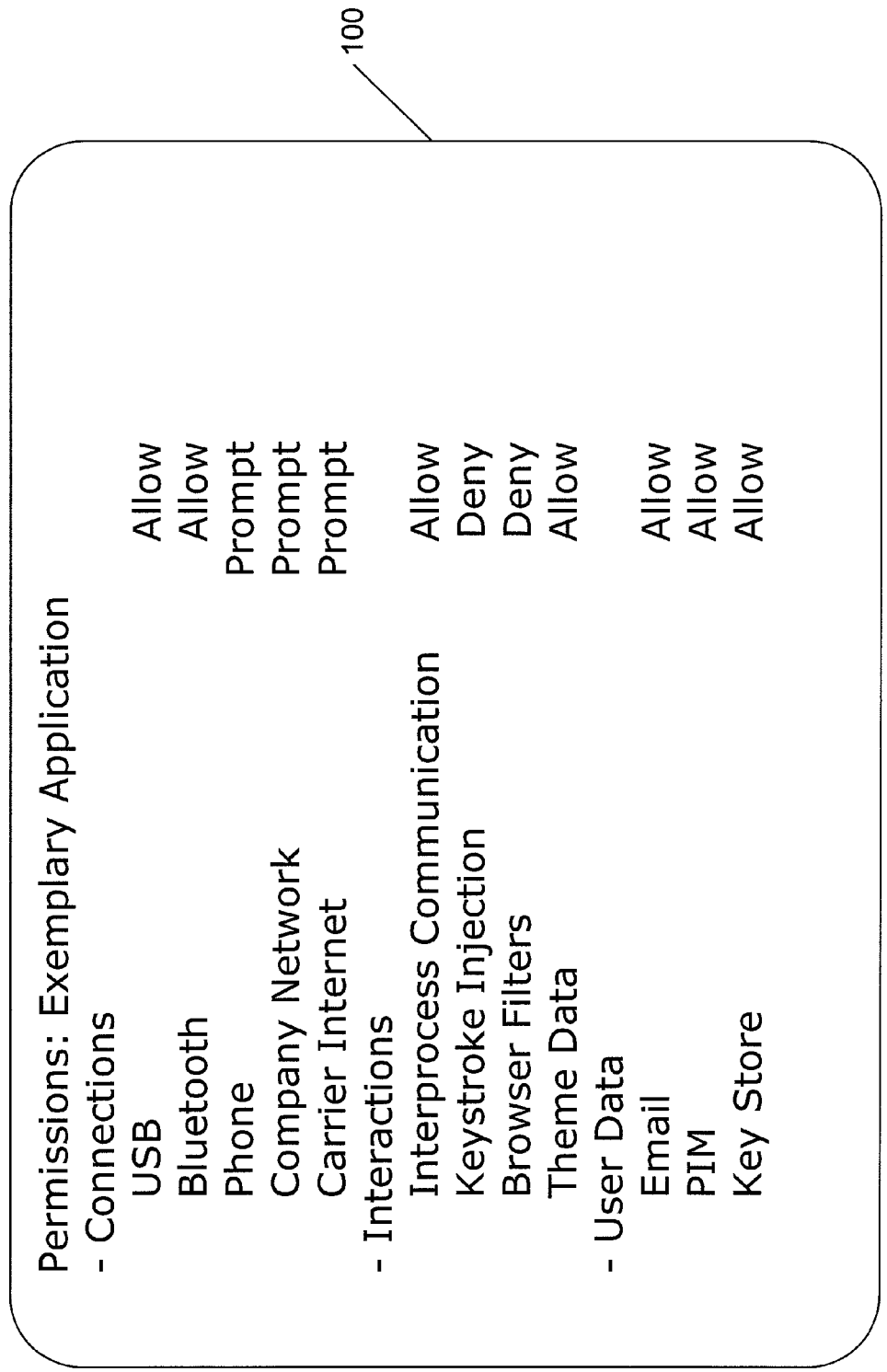
FIG. 1 illustrates an exemplary user interface window, which may be used to review and, if necessary, to change access permissions for a single application.

FIG. 1 illustrates an exemplary user interface (UI) window 100, which may be used to review and, if necessary, to change access permissions for a single application. As illustrated, access to many potential activities of the application may be controlled. The activities are divided into three groups: Connections; Interactions; and User Data. Furthermore, for each individual activity in these groups, permission may be set as "Allow", "Prompt" or "Deny".

Exemplary activities in the Connections group include: accessing a Universal Serial Bus (USB) connection; accessing a Bluetooth™ connection; accessing a Phone (voice telephony) connection; accessing a connection over the Company network; and accessing a connection over the Internet as provided to the mobile device by the entity supplying the wireless network, i.e., the "Carrier".

Exemplary activities in the Interactions group include: performing interprocess communication; performing keystroke injection; browser filtering; and accessing theme data.

Exemplary activities in the User Data group include: accessing e-mail messages; accessing personal information manager (PIM) data; accessing key store data; and accessing medium security key store data While it is useful to set access permissions, thereby limiting application activities, there remains a possibility that the access permissions may be subjectively considered to be set either at a level that is not stringent enough or set at a level so stringent as to restrict proper operation of a trusted application.

It may not be immediately clear to a user which access restriction is causing the problem with the proper operation of the trusted application. As such, the user may be forced into a time-consuming trial-and-error strategy to locate the access control that is restricting the proper operation of the trusted application. Clearly, information regarding the potential activities of the trusted application would allow a determination of which of the access permissions to lessen to allow the proper operation of the trusted application.

It has heretofore been unknown to review, ahead of time, the potential activities of an application. Clearly, the developer of the application will have considered the application activities, but such information is not normally available to an end user, or to an administrator of the device in use by the end user.

In overview, an audit of a compiled application can identify calls to predetermined methods. Given a known relationship between the predetermined methods and known activities, e.g., accessing elements of the mobile device on which the application is to be executed, a report may be presented to the user; the report indicating potential activities of the application. In one embodiment, the report is presented in a user interface structure consistent with the user interface structure used on the device to review and change permissions for applications.

Figure 2:
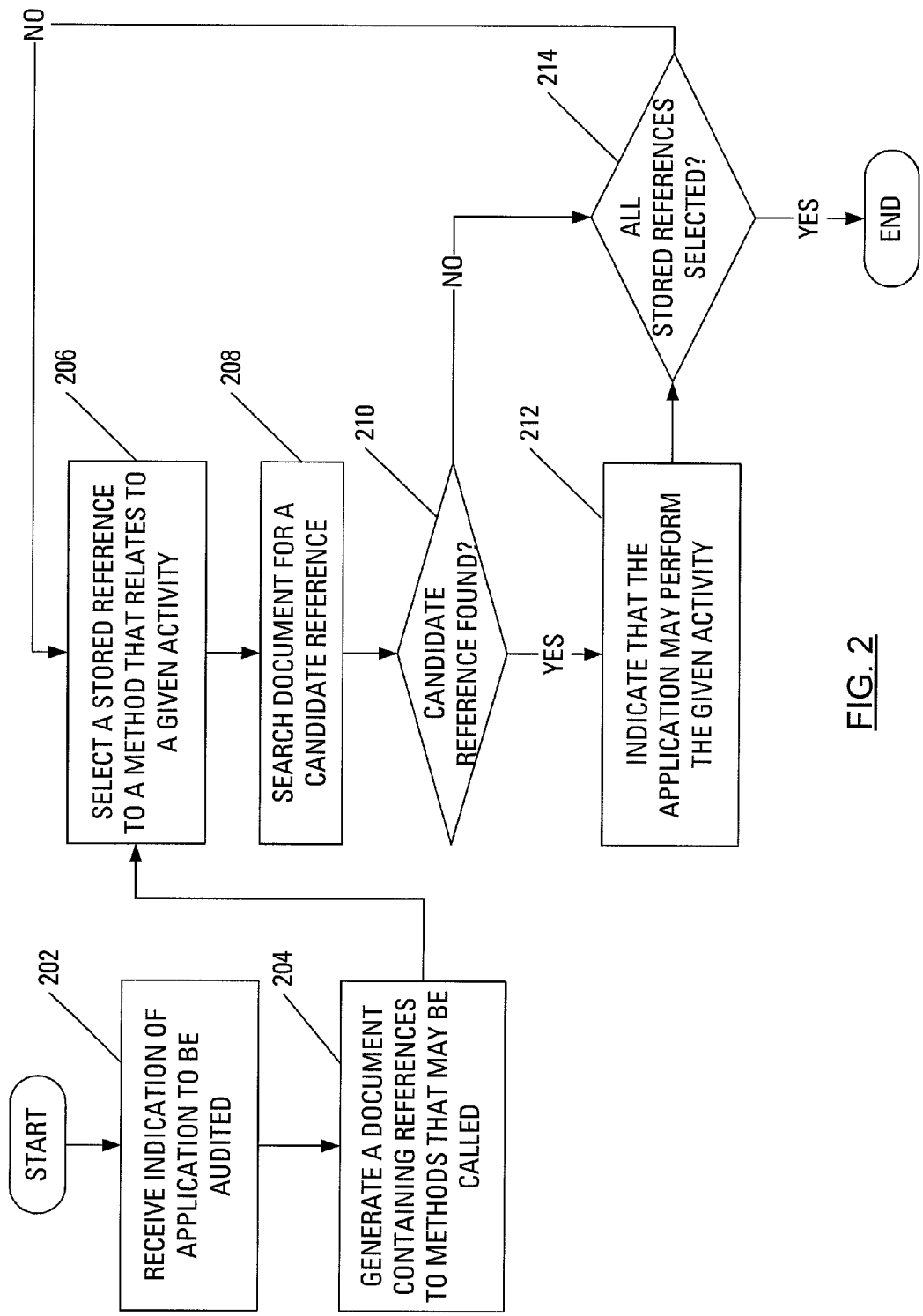
FIG. 2 illustrates steps of an exemplary method of auditing a compiled application to determine which of a set of controllable activities are likely to be attempted according to one embodiment.

FIG. 2 illustrates steps of an exemplary method of auditing a compiled application to determine which of a set of controllable activities are likely to be attempted. The exemplary auditing method may, for instance, be executed by a mobile device with a downloaded compiled application as input. Alternatively, the exemplary auditing method may, for another instance, be executed by a personal computer (PC) with a downloaded compiled application as input. The latter case may be under the control of an administrator of mobile devices. The administrator may audit the compiled application to determine whether a change is required in default settings for the mobile devices under control of the administrator.

For the following, it is considered that the exemplary auditing method is executed by a processor, without consideration whether the processor is in a portable, handheld computing device (e.g., a mobile communication device), in a PC or in a server. It is further considered that, in a first embodiment, the execution of the exemplary auditing method is triggered by a user of the device that houses the processor and, in a second embodiment, the auditing method is triggered automatically upon the downloading of a new application.

In the first embodiment, the user may, for example, indicate the application to be considered by selecting the application, causing a menu to be displayed and then selecting a menu item, from the displayed menu, which menu item specifies that the potential activities of the selected application are to be identified. The processor may then initialize execution of the exemplary auditing method.

In the second embodiment, upon downloading to the handheld computing device a new compiled application, the processor of the handheld computing device may initialize execution of the exemplary auditing method. Upon completion of execution of the auditing method, results may be presented to the user immediately or stored, so that the results may be accessed by the user in the future.

Initially, the processor receives (step 202) the indication of the application to be audited. The processor then generates (step 204) a document containing references to methods that may be called during execution of the application. In particular, the document generation step (step 204) involves creating a document, analyzing the application to identify methods that may be called during execution of the application and writing, to the document, a reference to each method identified during the analyzing.

To analyze the application to identify the methods, the processor executes a compiler of the type used to compile the application with an option that triggers analysis of the application to identify each method that may be called during execution of the application. Where the compiler is generically represented as "compiler.exe", obtaining the references may involve using a customized option, in the following example, "dumpmethodrefs".

```
compiler.exe -dumpmethodrefs %%i > NUL
```

It is expected to be well within the capabilities of a person of ordinary skill in the art of object-oriented compiler design to modify an existing compiler to add an option that allows the existing compiler to identify, for a given compiled application, a method that may be called.

Each written reference may include a significant, yet predictable, amount of extraneous text. For example, a reference to a method may be output as follows.

```
<element className='net.device.api.system.USBPort'
elementType='METHOD' methodName='write' parameters='int, '/>
```

The above output indicates that the application calls a method named "write" from a class named "net.device.api.system.USBPort". The term "API" is a well-known acronym for Application Programming Interface. An API is an interface provided by a computer system, library or application in order to allow requests for services to be made of the provider of the API by other computer programs and/or to allow data to be exchanged between the provider of the API and the other computer programs. Many of the potential activities of an application may be identified through the identification of calls to methods in classes that are provided by various APIs.

Standard searching and stream editing tools may be used to strip the extraneous information out of the written references and store the stripped references in a document, as follows.

```
cat %%~ni.xml | egrep className | sed -e "s#^ .*className='##"
-e "s#elementType='[ ]*' ##" -e "s#' methodName='#.#" -e "s#'
parameters='#( #" -e "s#' />#( )#" -e "s#, '/># )#" >>
calls.tmp
```

The searching and stream editing can reduce the previously presented line of output from the compiler to the following line of stripped output.

```
net.device.api.system.USBPort( int )
```

The stripped references in the document (e.g., calls.tmp) may then be arranged to only include a single reference to each distinct method.

```
cat calls.tmp | sort -u > calls.txt
```

Once the latter document (e.g., calls.txt) has been created and contains references to methods potentially called, that document can be searched for references to a particular method that is known to be related to a given activity. To that end, a database may be provided, which stores a list of references to methods and an association between the references and known activities to which the methods referred to relate.

The processor then selects (step 206) a stored reference, where the stored reference relates to a method and the method is associated with a given activity. Once the stored reference has been selected, the processor searches (step 208) the latter document for a candidate reference, where the candidate reference is a match for the selected stored reference.

Responsive to the processor determining (step 210) that the candidate reference has been found, the processor indicates (step 212) that the application will possibly perform the given activity. The search and indication may be implemented as follows.

```
egrep -q -e "net.device.api.system.USBPort" calls.txt
if NOT ERRORLEVEL 1 (
    echo    Your application may access the USB port.
)
```

After indicating (step 212), or determining (step 210) that the candidate reference has not been found, the processor determines (step 214) whether all stored references have been selected. If all stored references have been selected, the method is complete. However, if there are more stored references left to select, the processor returns to step 206 to select another stored reference.

The indication (step 212) that the application may perform certain given activities may be implemented in a number of ways. For instance, a complete output may take the form of a list, which list may be output to the display of the device, as follows.

```
Your application:
    Accesses persistent data store
    Accesses the runtime data store
    Posts global events to all apps in the system
    Opens connections
    Accesses the serial port
    Accesses the USB port
    Accesses the Code Module Manager API.
    Accesses the Browser Filter API.
    Accesses the Theme Injection API.
    Accesses the Email API.
    Accesses the PIM API.
    Accesses the File API.
    Accesses the User Authenticator API.
```

Alternatively, as illustrated in a UI window 300 of FIG. 3, indication that the application may perform given activities may be presented in conjunction with an indication of the current permission settings. Advantageously, in this latter indication implementation, a user may quickly ascertain a source of conflict between activities the application may attempt and the current permission settings. For example, as indicated in the UI window 300 of FIG. 3, the application may attempt to access the Carrier Internet, for which the current permission is set at "Prompt". The user may wish to maintain this permission setting to control the access of the application to the Carrier Internet or, if the access becomes frequent and annoying and would always be allowed, the user may change the permission setting to "Allow".

Figure 4:
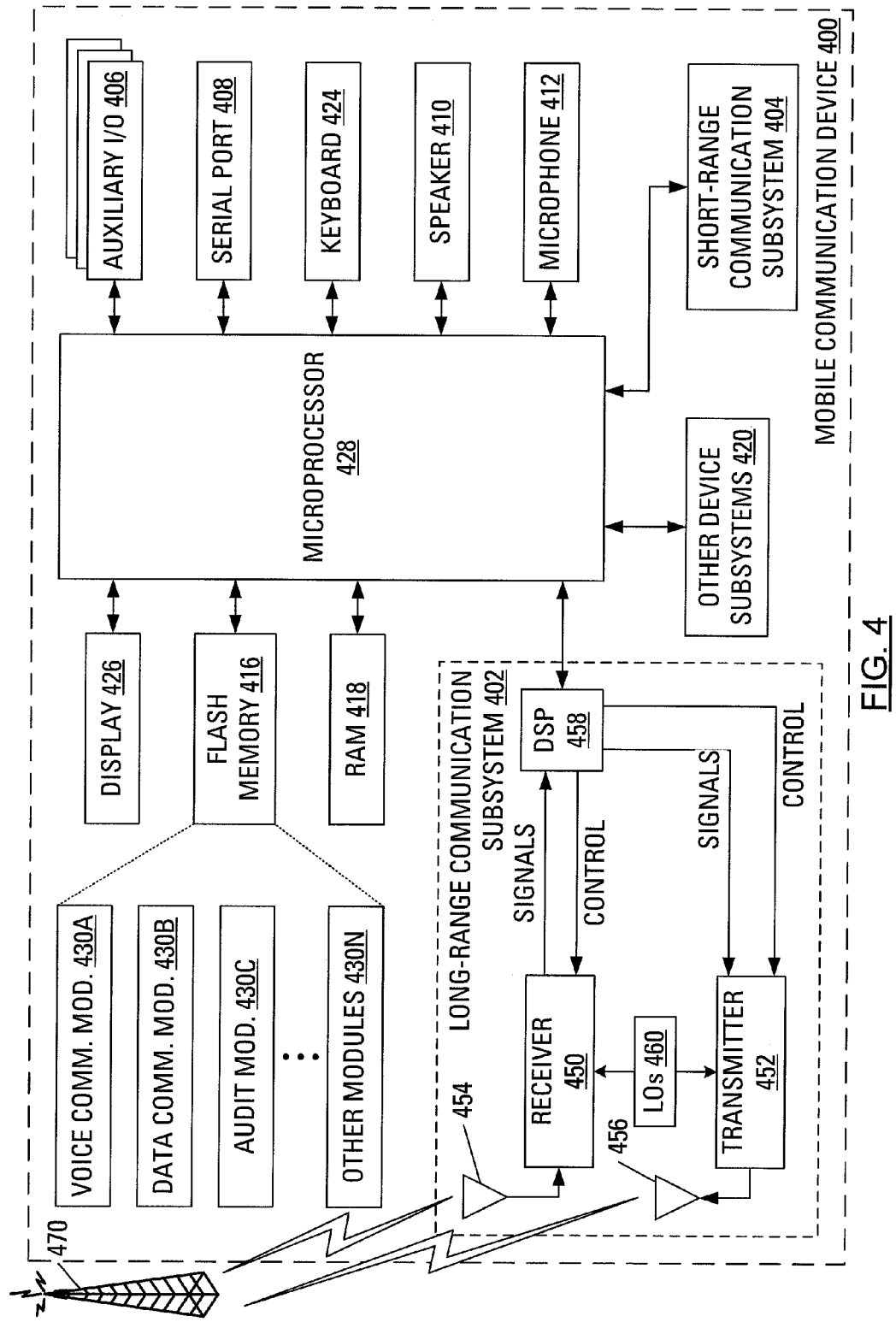
FIG. 4 illustrates an exemplary hardware configuration for a mobile device operable to carry out the method of FIG. 2.

FIG. 4 illustrates an exemplary hardware configuration for a mobile device 400 operable to carry out the method of FIG. 2. The mobile device 400 includes a housing, an input device (a keyboard 424) and an output device (a display 426), which is preferably a full graphic, or full color, Liquid Crystal Display (LCD). Other types of output devices may alternatively be utilized. A processing device (a microprocessor 428) is shown schematically in FIG. 4 as coupled between the keyboard 424 and the display 426. The microprocessor 428 controls the operation of the display 426, as well as the overall operation of the mobile device 400, in part, responsive to actuation of keys on the keyboard 424 by a user.

The housing may be elongated vertically, or may take on other sizes and shapes (including clamshell housing structures). The keyboard may include a mode selection key, or other hardware or software, for switching between text entry and telephony entry.

In addition to the microprocessor 428, other parts of the mobile device 400 are shown schematically in FIG. 4. These include: a long-range communications subsystem 402; a short-range communications subsystem 404; the keyboard 424 and the display 426, along with other input/output devices including a set of auxiliary I/O devices 406, a serial port 408, a speaker 410 and a microphone 412; as well as memory devices including a flash memory 416 and a Random Access Memory (RAM) 418; and various other device subsystems 420. The mobile device 400 is preferably a two-way radio frequency (RF) communication device having voice and data communication capabilities. In addition, the mobile device 400 preferably has the capability to communicate with other computer systems via the Internet.

Operating system software executed by the microprocessor 428 is preferably stored in a computer readable medium, such as the flash memory 416, but may be stored in other types of memory devices, such as a read only memory (ROM), persistent memory or similar storage element. In addition, system software and device-specific applications, or parts thereof, may be temporarily loaded into a volatile store, such as the RAM 418. Communication signals received by the mobile device 400 may also be stored to the RAM 418.

The microprocessor 428, in addition to its operating system functions, enables execution of software applications on the mobile device 400. A predetermined set of software applications that control basic device operations, such as a voice communications module 430A and a data communications module 430B, may be installed on the mobile device 400 during manufacture. An application activity auditing module 430C may also be installed on the mobile device 400 during manufacture, to implement aspects of the present application. As well, additional software modules, illustrated as another software module 430N, which may be, for instance, a PIM application, may be installed during manufacture.

The PIM application is preferably capable of organizing and managing data items, such as e-mail messages, calendar events, voice mail messages, appointments, contact information and task items. The PIM application is also preferably capable of sending and receiving data items via a wireless carrier network 470. Preferably, the data items managed by the PIM application are seamlessly integrated, synchronized and updated via the wireless carrier network 470 with the device user's corresponding data items stored or associated with a host computer system.

Communication functions, including data and voice communications, are performed through the long-range communication subsystem 402 and, possibly, through the short-range communications subsystem 404. The long-range communication subsystem 402 includes a receiver 450, a transmitter 452 and one or more antennas, illustrated as a receive antenna 454 and a transmit antenna 456. In addition, the long-range communication subsystem 402 also includes a processing module, such as a digital signal processor (DSP) 458, and local oscillators (LOs) 460. The specific design and implementation of the long-range communication subsystem 402 is dependent upon the communication network in which the mobile device 400 is intended to operate. For example, the long-range communication subsystem 402 of the mobile device 400 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Other types of data and voice networks, both separate and integrated, may also be utilized with the mobile device 400.

Network access requirements vary depending upon the type of communication system. Typically, an identifier is associated with each mobile device that uniquely identifies the mobile device or subscriber to which the mobile device has been assigned. The identifier is unique within a specific network or network technology. For example, in Mobitex™ networks, mobile devices are registered on the network using a Mobitex Access Number (MAN) associated with each device and in DataTAC™ networks, mobile devices are registered on the network using a Logical Link Identifier (LLI) associated with each device. In GPRS networks, however, network access is associated with a subscriber or user of a device. A GPRS device therefore requires a subscriber identity module, commonly referred to as a Subscriber Identity Module (SIM) card, in order to operate on a GPRS network. Despite identifying a subscriber by SIM, mobile devices within GSM/GPRS networks are uniquely identified using an International Mobile Subscriber Identify (IMSI) number.

When required network registration or activation procedures have been completed, the mobile device 400 may send and receive communication signals over the wireless carrier network 470. Signals received from the wireless carrier network 470 by the receive antenna 454 are routed to the receiver 450, which provides for signal amplification, frequency down conversion, filtering, channel selection, etc., and may also provide analog-to-digital conversion. Analog-to-digital conversion of the received signal allows the DSP 458 to perform more complex communication functions, such as demodulation and decoding. In a similar manner, signals to be transmitted to the wireless carrier network 470 are processed (e.g., modulated and encoded) by the DSP 458 and are then provided to the transmitter 452 for digital to analog conversion, frequency up conversion, filtering, amplification and transmission to the wireless carrier network 470 (or networks) via the transmit antenna 456.

In addition to processing communication signals, the DSP 458 provides for control of the receiver 450 and the transmitter 452. For example, gains applied to communication signals in the receiver 450 and the transmitter 452 may be adaptively controlled through automatic gain control algorithms implemented in the DSP 458.

In a data communication mode, a received signal, such as a text message or web page download, is processed by the long-range communication subsystem 402 and is input to the microprocessor 428. The received signal is then further processed by the microprocessor 428 for output to the display 426, or alternatively to some auxiliary I/O devices 406. A device user may also compose data items, such as e-mail messages, using the keyboard 424 and/or some other auxiliary I/O device 406, such as a touchpad, a rocker switch, a thumb-wheel, or some other type of input device. The composed data items may then be transmitted over the wireless carrier network 470 via the long-range communication subsystem 402.

In a voice communication mode, overall operation of the device is substantially similar to the data communication mode, except that received signals are output to the speaker 410 and signals for transmission are generated by the microphone 412. Alternative voice or audio I/O subsystems, such as a voice message recording subsystem, may also be implemented on the device 400. In addition, the display 426 may also be utilized in voice communication mode, for example, to display the identity of a calling party, the duration of a voice call, or other voice call related information.

The short-range communications subsystem 404 enables communication between the mobile device 400 and other proximate systems or devices, which need not necessarily be similar devices. For example, the short-range communications subsystem 404 may include an infrared device and associated circuits and components, or a Bluetooth™ communication module to provide for communication with similarly-enabled systems and devices.

While setting of access permissions by a user has been discussed, it should also be considered that the access permissions may be provided with default values by an administrator. The administrator may also set minimum access permissions to maintain a minimum level of security system-wide.

Figure 5:
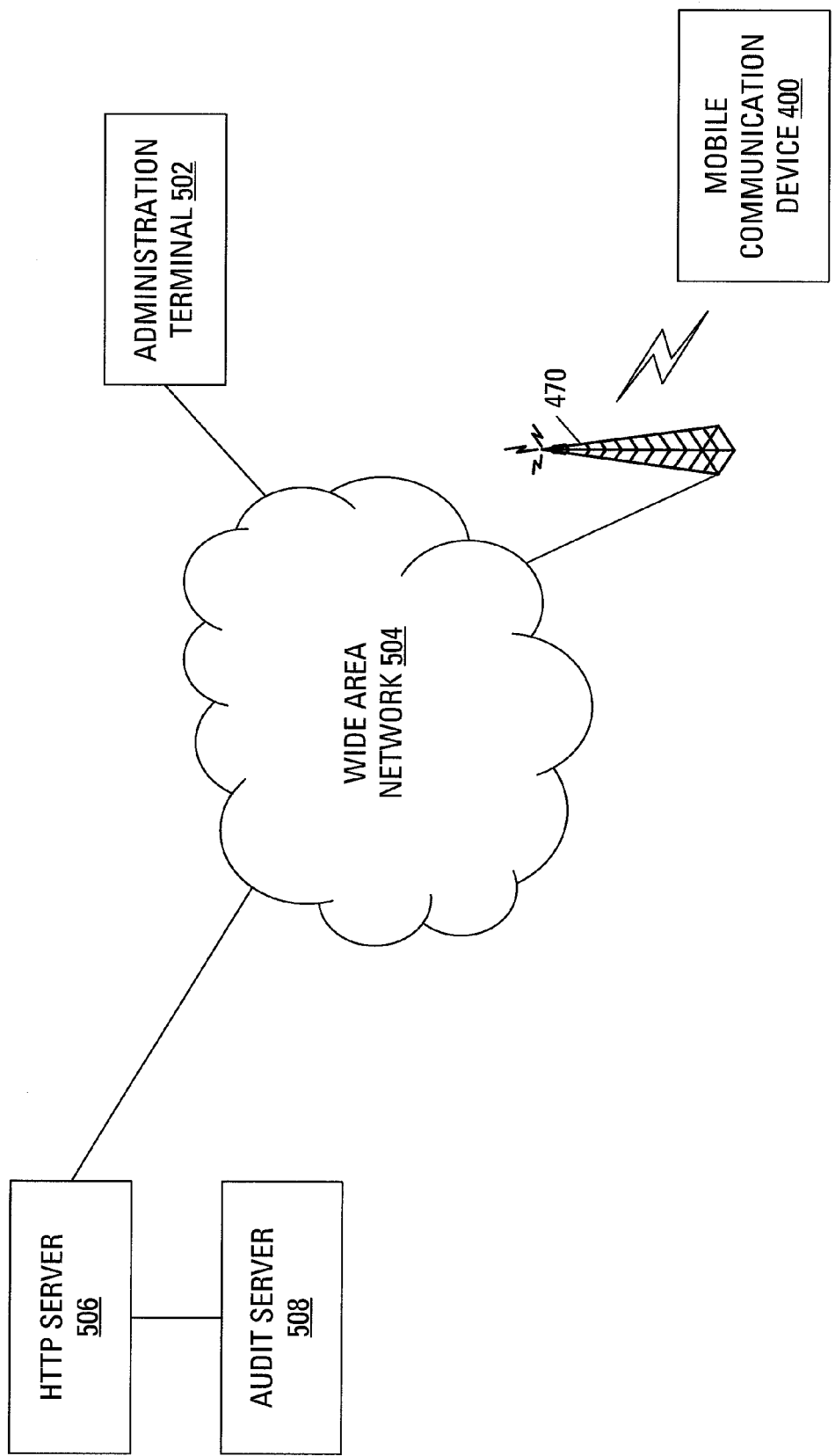
FIG. 5 schematically illustrates a network including an audit server according to one embodiment.

FIG. 5 schematically illustrates a portion of a network that includes an administration terminal 502. Through a wide area network 504, which may be considered representative of the present-day Internet or a successor network, the administration terminal 502 connects to the wireless carrier network 470 and thereby to the mobile communication device 400.

An administrator at the administration terminal 502 may transmit indications of minimum permissions for the mobile communication device 400 and transmit new applications to the mobile communication device 400. However, before transmitting a given application to the mobile communication device 400, the administrator may wish to audit the given application to determine the activities that may be attempted.

Figure 6:
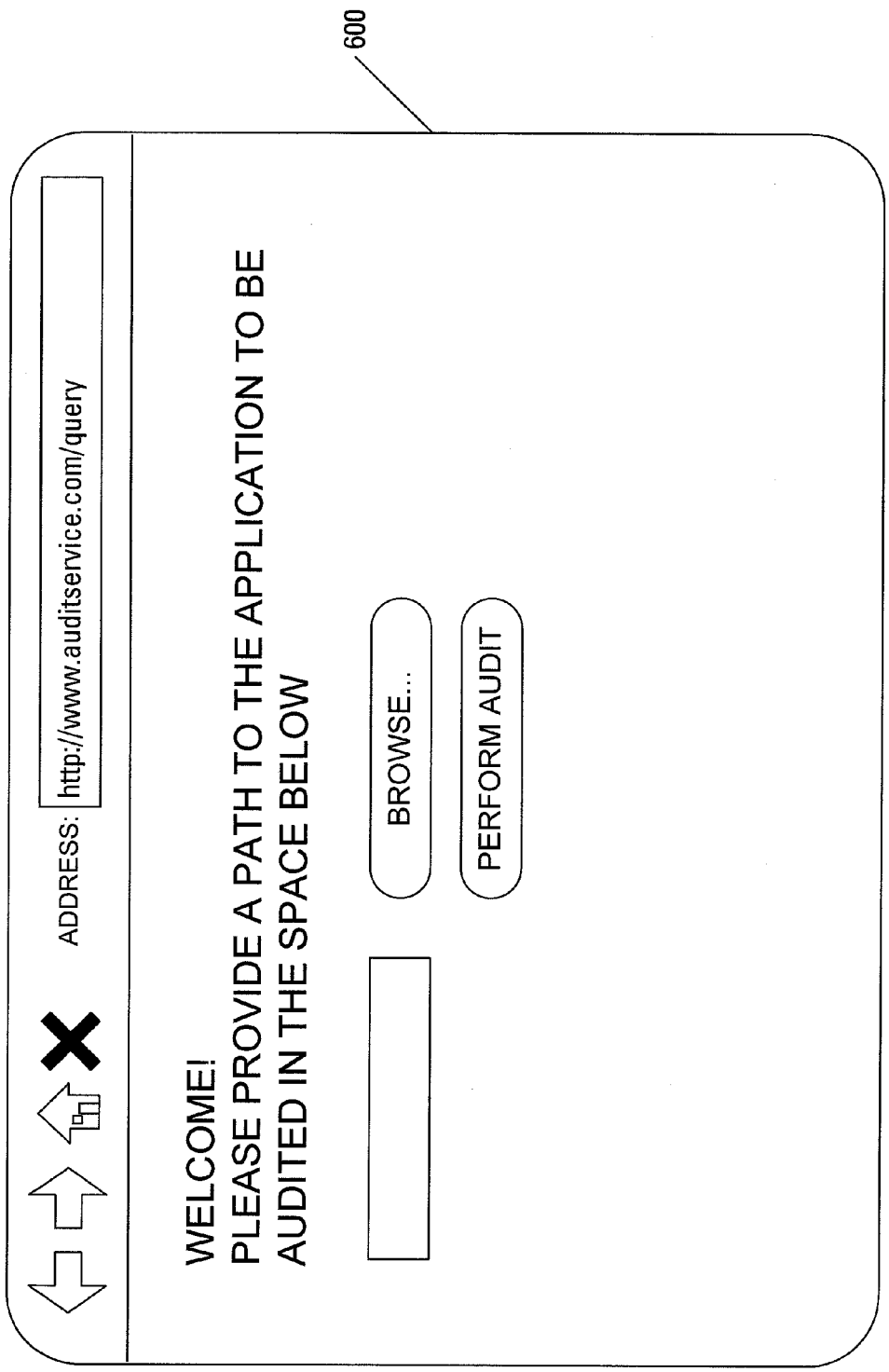
FIG. 6 illustrates a window provided by a world wide web browsing application, the window displaying an interface to an application activity auditing tool to be executed on a device separate from the device on which an application to be audited is stored.

From the point of view of an administrator, maintaining an up-to-date version of an audit tool, which may be employed to audit applications for activities, may be considered time-consuming and unnecessarily complex. For this reason, an audit tool may be executed remotely, say, at a site related to the supplier of the hardware of the mobile communication device 400, the compiler of the given application or both. The audit tool may be accessible through a World Wide Web portal, that is, a web page 600 (see FIG. 6) provided by a Hyper-Text Transport Protocol (HTTP) server 506, which is also connected to the wide area network 504. The web page 600 may have active components that allow an administrator to browse storage local to the administration terminal 502 to select a compiled application for uploading. Elements related to the page may then upload the compiled application from the administration terminal 502 to an audit server 508 associated with the HTTP server 506.

The audit server 508 may then execute an up-to-date audit tool to carry out the audit method of FIG. 2 with the uploaded compiled application as input. The output of the audit tool may then be served to the administration terminal 502 by the HTTP server 506 as a further web page 700 (see FIG. 7).

In review, an audit method is proposed, which audit method provides, to a user or to an administrator, information regarding the activities an application may attempt when executed. With that information, the user or administrator can make informed decisions on: which application control permission settings to apply; and whether it is desirable to use the application at all. For example, if a user downloads a board game application to the mobile device 400 and, through the application of the auditing tool, discovers that the board game application may access the telephone API and the PIM API, it may be that the user will elect not to execute the board game application.

The above-described embodiments of the present application are intended to be examples only. Alterations, modifications and variations may be effected to the particular embodiments by those skilled in the art without departing from the scope of the application, which is defined by the claims appended hereto.

What is claimed is:

1. A method of processing a compiled application, said method comprising:
   identifying, using a compiler modified to include a method identifying option, a method that may be called during execution of said compiled application, the identifying including:
      writing, to a first method-referencing document, a reference to said method that may be called during execution of said compiled application; and
      stripping extraneous information from said reference to generate a stripped reference to said method that may be called during execution of said compiled application;
   selecting a stored reference, wherein said stored reference relates to a particular method and said particular method is associated with an activity;
   determining that said particular method matches said stripped reference to said method that may be called during execution of said compiled application;
   responsive to determining that said particular method matches said stripped reference to said method that may be called during execution of said compiled application, indicating via a user interface that said compiled application may attempt said activity;
   indicating a current permission setting associated with said activity; and
   providing a user interface for changing, prior to execution of said compiled application, said current permission setting associated with said activity.

2. The method of claim 1 further comprising writing, to a second method-referencing document, said stripped reference to said method that may be called during execution of said compiled application.

3. The method of claim 2 wherein said determining that said particular method matches said stripped reference to said method that may be called during execution of said compiled application comprises searching said second method-referencing document for a candidate stripped reference, wherein said candidate stripped reference relates to said method that may be called during execution of said compiled application and said candidate stripped reference matches said stored reference.

4. The method of claim 1 wherein said indicating comprises displaying an indication that said compiled application may attempt said activity.

5. The method of claim 1 wherein said indicating comprises indicating, in a further document, that said compiled application may attempt said activity.

6. The method of claim 5 wherein said document is coded in hyper-text markup language and said indicating further comprises transmitting said document over a network connection.

7. The method of claim 1 wherein said activity is accessing a Universal Serial Bus (USB) Port.

8. The method of claim 1 wherein said activity is accessing a Bluetooth™ connection.

9. The method of claim 1 wherein said activity is accessing a voice telephony connection.

10. The method of claim 1 wherein said activity is accessing a private network connection.

11. The method of claim 1 wherein said activity is accessing an Internet connection.

12. The method of claim 1 wherein said activity is communicating with an executing process.

13. The method of claim 1 wherein said activity is injecting keystrokes.

14. The method of claim 1 wherein said activity is accessing a browser filter.

15. The method of claim 1 wherein said activity is accessing user data.

16. The method of claim 15 wherein said user data is message data.

17. The method of claim 15 wherein said user data is calendar data.

18. The method of claim 15 wherein said user data is contact information.

19. The method of claim 1 further comprising, before said processing:
   receiving an indication of selection of said compiled application; and
   receiving an instruction to process said compiled application.

20. The method of claim 1 further comprising, before said processing:
   receiving said compiled application from a remote source; and
   storing said compiled application.

21. A computing apparatus for processing a compiled application, said computing apparatus comprising a processor adapted to:
   identify, using a compiler modified to include a method identifying option, a method that may be called during execution of said compiled application, by:
      writing, to a first method-referencing document, a reference to said method that may be called during execution of said compiled application; and
      stripping extraneous information from said reference to generate a stripped reference to said method that may be called during execution of said compiled application;
   select a stored reference, wherein said stored reference relates to a particular method and said particular method is associated with an activity;
   determine that said particular method matches said stripped reference to said method that may be called during execution of said compiled application;
   indicate that said compiled application may attempt said activity, responsive to determining that said particular method matches said stripped reference to said method that may be called during execution of said compiled application;
   indicate a current permission setting associated with said activity; and
   provide a user interface for changing, prior to execution of said compiled application, said current permission setting associated with said activity.

22. A computer readable medium containing computer-executable instructions that, when performed by processor, cause said processor to:
   identify, using a compiler modified to include a method identifying option, a method that may be called during execution of said compiled application, the identifying including:
      writing, to a first method-referencing document, a reference to said method that may be called during execution of said compiled application; and
      stripping extraneous information from said reference to generate a stripped reference to said method that may be called during execution of said compiled application;
   select a stored reference, wherein said stored reference relates to a particular method and said particular method is associated with an activity;

determine that said particular method matches said stripped reference to said method that may be called during execution of said compiled application; and indicate that said compiled application may attempt said activity, responsive to determining that said particular method matches said stripped reference to said method that may be called during execution of said compiled application;

indicate a current permission setting associated with said activity; and provide a user interface for changing, prior to execution of said compiled application, said current permission setting associated with said activity.

23. The method of claim 1 further comprising receiving, prior to said execution of said compiled application and via said user interface, a command to change said current permission setting associated with said activity to deny said activity.

24. The computing apparatus of claim 21 wherein said processor is further adapted to write, to a second method-referencing document, said stripped reference to said method that may be called during execution of said compiled application.

25. The computing apparatus of claim 24 wherein said processor is further adapted to search said second method-referencing document for a candidate stripped reference, wherein said candidate stripped reference relates to said method that may be called during execution of said compiled application and said candidate stripped reference matches said stored reference.

26. The computing apparatus of claim 21 wherein said processor is further adapted to control display of an indication that said compiled application may attempt said activity.

27. The computing apparatus of claim 21 wherein said processor is further adapted to indicate, in a further document, that said compiled application may attempt said activity.

28. The computing apparatus of claim 27 wherein said document is coded in hyper-text markup language and said processor is further adapted to transmit said document over a network connection.

29. The computing apparatus of claim 21 wherein said activity is accessing a Universal Serial Bus (USB) Port.

30. The computing apparatus of claim 21 wherein said activity is accessing a Bluetooth™ connection.

31. The computing apparatus of claim 21 wherein said activity is accessing a voice telephony connection.

32. The computing apparatus of claim 21 wherein said activity is accessing a private network connection.

33. The computing apparatus of claim 21 wherein said activity is accessing an Internet connection.

34. The computing apparatus of claim 21 wherein said activity is communicating with an executing process.

35. The computing apparatus of claim 21 wherein said activity is injecting keystrokes.

36. The computing apparatus of claim 21 wherein said activity is accessing a browser filter.

37. The computing apparatus of claim 21 wherein said activity is accessing user data.

38. The computing apparatus of claim 37 wherein said user data is message data.

39. The computing apparatus of claim 37 wherein said user data is calendar data.

40. The computing apparatus of claim 37 wherein said user data is contact information.

41. The computing apparatus of claim 21 wherein said processor is further adapted to:
receive an indication of selection of said compiled application; and
receive an instruction to process said compiled application.

42. The computing apparatus of claim 21 wherein said processor is further adapted to:
receive said compiled application from a remote source; and
store said compiled application.

* * * * *